(12) United States Patent
Carver, Sr.

(10) Patent No.: US 6,502,347 B1
(45) Date of Patent: Jan. 7, 2003

(54) LIGHTED INSECT TRAP

(75) Inventor: Robert W. Carver, Sr., Richmond, VA (US)

(73) Assignee: Alex Smith, Midlothian, VA (US)

( * ) Notice: Subject to any disclaimer, the term of this patent is extended or adjusted under 35 U.S.C. 154(b) by 0 days.

(21) Appl. No.: 10/066,696

(22) Filed: Feb. 6, 2002

(51) Int. Cl.[7] ............................................. A01M 1/04
(52) U.S. Cl. .......................................... 43/113; 43/122
(58) Field of Search .................................. 43/113, 122

(56) References Cited

U.S. PATENT DOCUMENTS

| | | | |
|---|---|---|---|
| 135,366 A | * | 1/1873 | Rigell ........................... 43/113 |
| 720,990 A | | 2/1903 | Williams |
| 836,052 A | | 11/1906 | Pool |
| 869,556 A | | 10/1907 | De Haas |
| 1,012,420 A | * | 12/1911 | Oneal ........................... 43/113 |
| 1,488,178 A | * | 3/1924 | Thomas et al. ............... 43/113 |
| 1,666,509 A | * | 4/1928 | Schlossareck ................ 43/113 |
| 1,751,130 A | * | 3/1930 | Cornelius et al. ............. 43/113 |
| 1,946,509 A | | 2/1934 | Trammell |
| 1,981,683 A | | 11/1934 | Wentzell |
| 3,059,373 A | * | 10/1962 | Gardner ........................ 43/113 |
| 3,820,273 A | | 6/1974 | Novak |
| 4,086,720 A | * | 5/1978 | Wiser ........................... 43/113 |
| 4,212,129 A | | 7/1980 | Shumate |
| 4,856,226 A | * | 8/1989 | Taylor .......................... 43/113 |
| 4,876,822 A | | 10/1989 | White |
| 4,986,024 A | * | 1/1991 | Peek et al. .................... 43/107 |
| 5,274,949 A | * | 1/1994 | Beaton ......................... 43/107 |
| 5,323,556 A | | 6/1994 | Carle |
| 5,365,690 A | | 11/1994 | Nelson et al. |
| 5,647,164 A | * | 7/1997 | Yates ........................... 43/113 |
| 6,134,826 A | | 10/2000 | Mah |

* cited by examiner

Primary Examiner—Peter M. Poon
Assistant Examiner—Joan M. Olszewski
(74) Attorney, Agent, or Firm—Banner & Witcoff, Ltd.

(57) ABSTRACT

An effective insect trap comprises a housing that substantially encloses an interior space for trapping and killing insects. A conduit is attached to or formed from the housing, where the conduit is shaped to facilitate entry of insects into the trap interior space, based on the insects' natural motion and its attraction to light radiating from within the trap. The conduit, or preferably multiple conduits, narrows in cross sectional area to a conduit end that is open to the interior space. A socket used to secure a light bulb is positioned such that, when the bulb is in the socket, the bulb is within about one inch of the conduit end. Overall, the trap hinders the escape of trapped insects through the conduit and under some conditions is selective to biting insects, such as mosquitoes, mosquito types, and sub-miniature biting midges, over other types of insects.

1 Claim, 2 Drawing Sheets

LIGHTED INSECT TRAP

FIELD OF THE INVENTION

The present invention relates to an apparatus and method for trapping and killing insects, particularly the biting type (e.g. mosquitoes). The invention combines a housing with at least one conduit to lure insects therein.

BACKGROUND OF THE INVENTION

While flying insects, particularly those that pollinate, are indispensable to the overall balance of nature, there also exist many types that pose a hindrance to the enjoyment of the outdoors. Depending on the location and time of year, biting insects can be extremely annoying to humans to the point where, for example, simply being outside on a warm summer evening may be fraught with a seemingly endless onslaught from mosquitoes and other bugs. Even more significant than simply causing discomfort, bites from flying insects, particularly mosquitoes, are known to spread a number of diseases such as malaria, yellow fever, and more recently, West Nile Virus.

To date, various insect traps have been in use and many such traps rely on high voltage, poisonous bait, or insecticides that may be present as foul-smelling fumes or dust particles that are harmful to human and animal life. The commonly used zapper-type instruments that electrocute insects are known to produce unpleasant crackling or sizzling sounds, especially when a large insect (e.g. a moth) is boiled from the inside. Furthermore, these products can also emit unappetizing odors that can detract from the pleasantness of outdoor dining and other activities. Overall, poisons and voltage as means of killing insects share in the additional drawback that they pose a danger to humans (especially children) and animals that may come into contact with devices employing such means either inadvertently or out of curiosity.

Other apparatuses known in the art use less harmful methods to trap and/or exterminate insects. For example, U.S. Pat. No. 6,134,826 B1 provides a combination of ultraviolet light, a low voltage grid array, and a unit to supply additional energy to ensure the trapped insect's death. In another approach, U.S. Pat. No. 5,323,556 B1 uses a fan to suck insects into an enclosure by inducing a sub-ambient pressure therein, along with an insect-attracting light mounted on the inside of an opening to the enclosure. These devices require power to be supplied to a multiplicity of separate components and introduce the possibility that failure of any one of these components will render the apparatus largely ineffective.

Simpler traps are disclosed, for example, in U.S. Pat. Nos. 4,212,129 B1, 3,820,273 B1, 1,981,683 B1 and 836,052 B1. However, these disclosures do not address the ease with which the sequestered insects can escape through the openings that allow their entry into the trap. Of these, U.S. Pat. No. 1,981,683 B1 has the further disadvantage of being difficult to clean. Other patents, for example, U.S. Pat. Nos. 869,556 and 720,990 require the use of poison to kill trapped insects before they can emerge from the trap.

In contrast to the prior art, the present invention provides an insect trap that is simple to operate, meaning that the need for multiple electrical or electro-mechanical parts is avoided. Also, both indoor and outdoor use are appropriate, cleaning is easy, and special precautions associated with high voltage or poisonous chemicals are unnecessary. In addition to these considerations relating to simplicity and low cost, the insect trap of the present invention is effective in providing a broad region of illumination that draws insects from virtually all directions while simultaneously preventing their escape. The degree of brightness emanating from the insect trap make it useful for illuminating areas of outdoor nighttime activities. Preferred embodiments of the present invention provide an insect trap that selectively exterminates insects of the biting type, which are most harmful to humans, while leaving populations of environmentally beneficial and other non-biting insects largely unharmed.

SUMMARY OF THE INVENTION

In one embodiment, the present invention is an insect trap comprising a housing substantially enclosing an interior space for trapping and killing insects. At least one conduit is provided for allowing insects to enter the interior space. The conduit is attached to or formed from the housing and narrows in cross sectional area to a conduit end open to the interior space. The trap also includes a light bulb socket attached to the housing such that, when a light bulb is in the socket, the light bulb is within about one inch of the conduit end.

In a preferred embodiment, the present invention is an insect trap comprising a body that includes four funnels of glass or a clear plastic. Each funnel has wide and narrow ends, and each of the wide ends has a top edge, a bottom edge, and side edges. The wide ends of the funnels are joined to one another along their side edges at substantially right angles, while the narrow ends extend into an interior space for trapping and killing insects. The trap includes a lid joined to the top edges of the wide ends of the four funnels, and the lid has at least one vent screen. The lid includes or is attached to a light socket into which a clear glass incandescent light bulb having a power consumption of at least 50 watts is secured. The bulb is within about one inch of each of the narrow ends of the funnels, and at least part of the lid is detachable to allow replacement of the bulb. The insect trap also includes a base joined to each of the bottom edges of the wide ends of the four funnels. The base is adapted to hold a liquid for drowning or poisoning insects, and at least part of the base is detachable to allow cleaning of the trap.

In another embodiment, the present invention is a method for reducing the quantity of flying insects within a localized region. The method comprises positioning and energizing an insect trap in the region. The trap comprises a housing substantially enclosing an interior space for trapping and killing insects. At least one conduit is provided for allowing insects to enter the interior space. The conduit is attached to or formed from the housing and narrows in cross sectional area to a conduit end open to the interior space. The trap also includes a light bulb in a socket attached to the housing. The light bulb is within about 1 inch of the conduit ends and consumes at least about 50 watts of power.

DETAILED DESCRIPTION OF THE INVENTION

Figure 1:
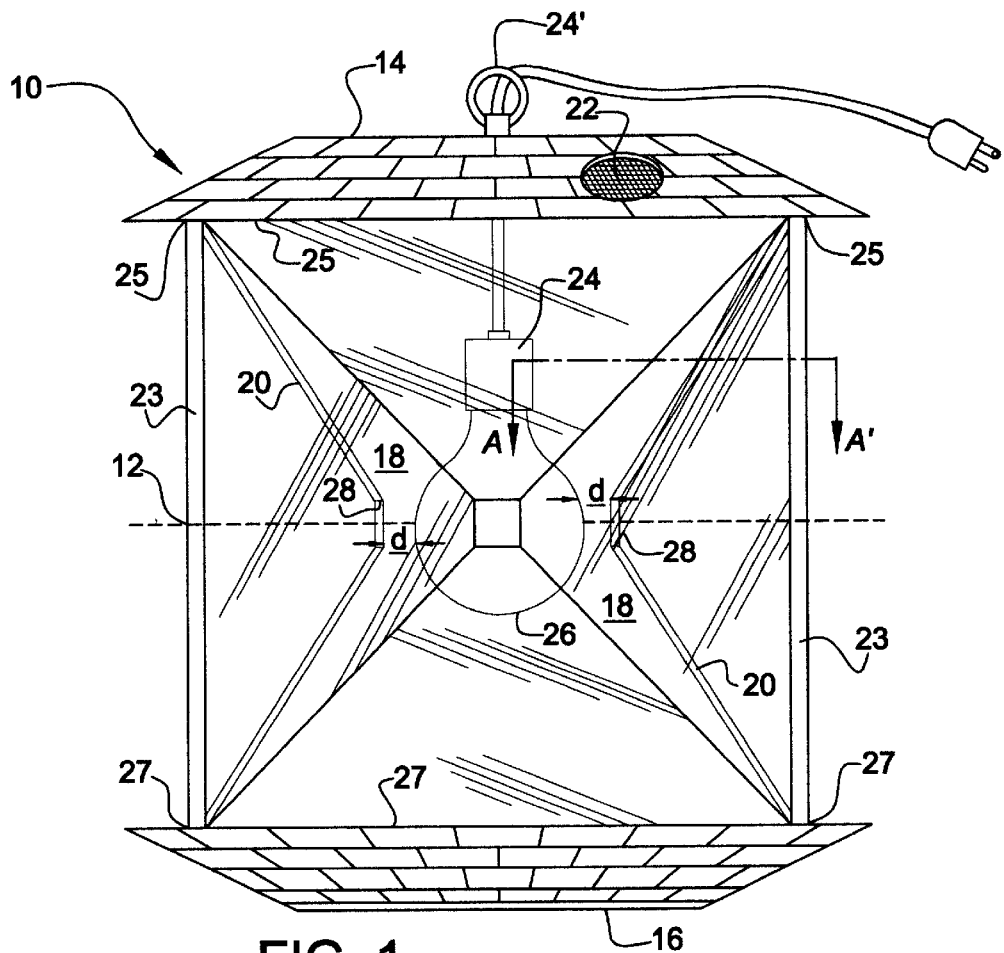
FIG. 1 is a front view of one embodiment of an insect trap of the present invention.

The insect trap of the present invention provides a simple, safe, and effective means for reducing the population of insects in a localized region. The invention may also selectively reduce, relative to the total population of insects in a region, those biting insects that represent the greatest nuisance and potential health risks to humans. The insects of a biting type for which the insect trap of the present invention is particularly effective include sub-miniature biting midges (ceratopogonidae) which have proven especially difficult to trap and kill using conventional traps, as such insects are known to crawl through small screens. Depending on the locality, these insects are referred to, among other names, as noseeums or see-no-things.

Also included in the biting type insects for which the trap of the present invention is selective are mosquitoes and other mosquito type insects that may be carriers of viruses, such as yellow fever, malaria, encephalitis, and the recently troublesome West Nile Virus, which poses a serious health threat to humans and/or animals. In this respect, the present invention provides a cost-effective means of reducing the risk of diseases that are especially prevalent in economically disadvantaged areas, where residents could greatly benefit from a simple yet effective solution to the continual threat insect-borne disease. The trap may alternatively be an effective tool for collecting samples of biting insects in a given region for analysis of which viruses they might be capable of transmitting and for subsequent recommendations as to preventative or therapeutic medical treatments that may be necessary based on such analysis.

The insect trap of the present invention comprises a housing that substantially encloses an interior space for trapping and killing insects. The housing allows one or more conduits to extend into the interior space so that the conduit or conduits provide a passageway for insects to become entrapped and die. The housing maximizes the probability that the insect's natural motion will carry it into the interior of the trap and virtually eliminates any possibility of escape therefrom. These characteristics are believed to arise by virtue of a number of factors, including the positioning and shape of the conduits, as well as the positioning and power output of the source of illumination used to attract insects.

Other considerations relate to the type of material used for the housing. Advantageously, it is at least partially constructed of a material that allows a high level of transmission of light from a light bulb or other source of illumination positioned in the interior space of the trap, while at the same time offers a smooth surface to which insects have difficulty in adhering. Another factor to be considered is the degree to which the housing material may be molded into smooth, continuous conduits that do not substantially impede an insect's forward momentum toward the interior of the trap. The conduits may be integral with the housing, such as in a single molded unit. Alternatively, the conduits may be attached to the housing as separate pieces using any conventional means such as gluing or providing mechanical connections such as threaded fittings or other joints that twist or snap into place. Any intermediate structures, such as couplings, may be used to directly or indirectly attach the conduits to the housing and should be considered to fall within the scope of the present invention.

The housing may be constructed of a single material, or it may in fact be desired to use one transparent material for the body of the housing surrounding the sides of the interior space and another material, either transparent or opaque, to form a lid and a base of the housing. If the lid and base are made of an opaque material, (e.g. wood), the trap still allows light from an interior light source to illuminate a space completely surrounding the trap and thus attract insects from all angles. Therefore, it is preferred that at least the body comprises a transparent material that allows the transmission of light through the sides of the trap. Preferably, a light bulb operating within the interior of the housing will provide substantial illumination completely around it (i.e. 360° of illumination) to attract insects from all angles. This also means that the insect trap can serve as a lamp to illuminate nighttime activities and simultaneously protect participants therein from the annoyance and/or harm from surrounding insects.

In another embodiment, a liquid (e.g. water or a water/detergent mixture), used to drown or poison insects, may be contained in a base of the trap and also used to seal the bottom of the trap. Thus, the trap may comprise a separate body/lid assembly that is completely detachable from the base. Of course, the base may also be physically joined to at least part of the body to provide a fixed connection. In either case, simply placing the body/lid assembly on, or attaching it to, the base, when the base is filled to a minimal depth with liquid, forms the trap. Therefore, the housing that encloses the interior space within the trap may partially comprise, at its lower boundary, the surface of the liquid. Of course, a sufficient seal (i.e. one that prevents the escape of the smallest insect desired to be trapped) may be formed between the surfaces of the body/lid assembly and base without the use of a liquid. However, in addition to sealing the interior space at the bottom of the trap, the liquid can be useful for other purposes, including expediting the demise of trapped insects and facilitating their removal. Depending on the depth and density of the liquid used, as well as the bulk density of the trap, it is even possible that the body/lid assembly may float on the surface of the liquid to enclose an interior space. In this case, the body/lid assembly may require some means of stabilization to prevent it from tipping.

From the characteristics of the housing material that are desired for the present invention and that are described above, it is therefore preferred to use glass or a clear plastic for at least part of the housing. If plastic is used, completely clear plastics are especially preferred and include, for example, commercially available polymers such as poly methylmethacrylate (e.g. Plexiglass®), polycarbonate (e.g. Lexan®), polyolefins (e.g. polyethylene), polyalkylene terepthalates (e.g. polyethylene terephthalate), polyvinyl chloride, and the like. Such clear plastics may also comprise co- and ter-polymers and include any additives known in the art, such as compatibilizers, emulsifiers, stabilizers, cross-linking agents, flame retardants, etc. When a clear plastic is used, the ability of the material to withstand shattering if dropped from a height from which it is suspended in normal use, as well as it resistance to deformation and melting in the proximity of a hot light bulb are important considerations. Plexiglass® is an especially preferred material as it exhibits the above properties and additionally can be fabricated with a very smooth, slippery surface such that insects flying in the direction of the trap are easily guided into its interior of and, once there, have great difficulty in adhering to the trap walls, rendering their escape nearly impossible. Also, this plastic has the additionally advantageous quality that it reflects some of the light emanating from a light bulb placed therein, thereby potentially disorienting an entrapped insect and further complicating any efforts to escape.

In addition to the housing, the insect trap of the present invention also comprises at least one conduit that allows insects into the interior space of the trap. To this end, as well as to help ensure that the entering insect cannot escape along the same or another conduit, the single or multiple conduits used will narrow to conduit ends. Therefore, the end of the conduit away from the interior of the trap may open to a large area and even comprise essentially a whole side of the housing from which it is formed, while the conduit end to which the conduit narrows will in general have a small cross sectional opening relative thereto. Preferably, the ratio of the cross sectional areas of the conduit end proximate the housing relative to the narrow conduit end extending to the interior of the trap is from about 3 to about 10. In a preferred embodiment, the conduit has a funnel shape that provides a smooth, gradual narrowing of the conduit surface to facilitate the transition of a moving insect from the exterior to the interior space of the trap. The conduit may extend in any direction toward the interior space of the trap. Preferably, however, the centerline axis of the conduit, running perpendicular to whatever cross sectional shape of the conduit is used, extends either horizontally or angled downward toward the interior to allow gravity to promote the insect's entry into the trap.

The insect trap also comprises a light bulb socket into which a light bulb can be affixed during normal operation to provide illumination in the interior space, thus attracting insects in the surrounding region that can detect the light due to its transmission through the housing, which is at least partly transparent. The socket also provides the electrical connection necessary for the bulb's functioning. The source of electricity for the trap may be a standard outlet having a voltage (most commonly either 120 or 240 V AC) and configuration in accordance with the particular region of use. In this case, the light bulb socket will have the proper attached wiring and prongs to plug into such an outlet. Alternatively, or in conjunction, the light bulb socket may be battery powered to allow for ease of transportability and use at campsites or other areas where an electrical outlet is not readily available. Other known power sources, e.g. stored solar energy, fuel cells, etc. are also possible.

The location of the socket is such that the light bulb, when affixed thereto in normal operation, will come to within about one inch of the narrow conduit end that extends to the interior of the trap. Where multiple conduits are used, it is preferred that the bulb should be within about one inch of at least one but preferably all of the ends of the conduits extending to the interior of the housing. More preferably, the distance between the bulb and the conduit ends, expressed as the distance between their closest points of proximity, is about 0.5 inches or less. The light bulb socket may be built directly into the housing of the trap, such as, when the housing comprises a lid of the trap, the socket is made part of the lid. Otherwise, the socket may be attached to, or hung from, other structures of the trap, including the base or the conduits. Components from which the socket may be suspended, secured, or positioned in the interior space of the trap are also within the scope of the invention.

The significance of the distance from the narrow conduit end to the light bulb is related to preventing trapped insects from escaping the interior of the trap. In controlling this distance, at least two factors may help promote the trap's effectiveness. First, the mere physical presence of the bulb essentially blocks the re-entry of trapped insects into the proximate narrow ends of the conduits from which they could theoretically escape. Second, when the bulb is in operation, intense light and heat develop at those locations where a trapped insect must move in order to even begin to escape through the narrow conduit ends. The combination of these factors essentially ensures that the trapped insect is prevented from leaving, as the light bulb presents both a large physical barrier as well as a source of heat that the insect cannot bear. To provide the proper spacing between the light bulb and the narrow conduit ends, the trap can include its own specialized bulb that fits therein within the proper tolerances. In the alternative, the socket and conduits used in the trap may be positioned therein such that a standard size light bulb, when engaged in the socket, is within the proper distance from the conduit end.

Without being bound by any particular theory, it is believed that the effectiveness of the trap is due at least in part to the fact that the forward momentum of insects approaching the lighted trap carries them through the conduit and into the interior space. Insects present in the trap cannot escape through the conduit ends because of the close proximity of the conduit ends to the bright, hot light bulb in the interior of the trap. Since the brightness and heat that a bulb emits in any given circuit is substantially a function of its power rating, higher wattage bulbs are generally preferred over lower wattages bulbs. In the present invention, the power consumption of the bulb is preferably at least about 50 watts and more preferably at least about 100 watts to generate sufficient brightness and heat output as described above to hinder the possible retreat of a trapped insect backwards through the conduit.

Furthermore, it has been found that the use of a clear glass incandescent light bulb provides exceptional performance of the trap in terms of both the sheer number of insects exterminated as well as the selectivity of the trap to biting type insects, including mosquitoes. A selectivity to biting type insects may be construed as a greater proportion of biting type insects to all insects killed in the trap, relative to the general proportion of biting insects to all insects in the region where the trap is used. In comparing such proportions, it may be desirable to consider all types of insects or only flying insects. Alternatively, selectivity to biting insects may also be identified based on a relative comparison of the ratio of biting type to overall insects in a trap of the present invention relative to the same ratio measured for a conventional trap. A higher such ratio for the trap of the present invention would indicate selectivity to biting type insects.

In addition to a housing, one or more conduits, and a light bulb socket, the insect trap may include other structures to improve its operation. For example, the trap may incorporate a housing comprising a base that is formed to hold a liquid covering the bottom surface of the interior space of the trap. For convenience, such a liquid is preferably water or may be water with an amount of added detergent or other surfactant to break the surface tension of the water and thereby improve its ability to drown trapped insects. The liquid may also be a substance that is poisonous to the trapped insects in order to kill them more quickly, although the use of poison is not a necessary element for effective functioning of the trap of the present invention. The bottom of the trap may be covered with known substances to which insects will adhere and become immobilized until their death. Alternatively, a source of electric energy may additionally be used to destroy trapped insects.

It is preferred that the base of the trap is at least partly detachable to allow cleaning, servicing, or replacement of the parts. By partly detachable is meant that at least part of the base may be removed or propped open (e.g. by the use of a fitting or part that snaps in place to form a seal) to allow a user easy access to the interior space of the trap after it has been in operation for some time. Likewise, it is also preferred that, when the housing of the trap includes a lid covering a plastic body, the lid is also at least partly detachable to allow replacement of a light bulb and/or service any vents or other structures near the top of the trap.

Vents may be useful if a means of cooling the trap is desirable. For instance, vent holes or screens incorporated into the structure of the lid can allow hot air generated within the trap during normal operation to escape. Vents may also be important for inhibiting the formation of condensate on the interior surfaces of the trap due to evaporation of water from a water reservoir at the bottom of the trap, followed by condensation. Any conventional means to impart detachability of the base and/or lid of the trap may be used; for example, instead of a part that can be snapped into place, a removable part may be affixed to the base or lid using small screws, bolts, etc.

A front view of an insect trap according to a preferred embodiment of the present invention is shown in FIG. 1. In this specific embodiment, the insect trap 10 comprises a body 12, a lid 14, and a base 16 that together make up the housing of the trap 10, wherein the housing encloses an interior space 18 for trapping and killing insects. The trap 10 also has four conduits 20 that are formed from the housing, and specifically from the four adjacent sides of the body 12 of the housing. Using this configuration, essentially the entire area of the body 12 of the trap 10 serves as an inwardly directed surface that forms conduits 20 leading insects that surround the trap over 360° about its periphery toward the interior 18. In the embodiment shown in FIG. 1, the body 12 of the housing comprises four rectangular funnels joined together along parallel, opposite sides or edges 23 of their respective wide rectangular ends, or bases of the rectangular funnels. Sealing connections along these sides or edges may be established using any conventional means such as glue or screws. It is not necessary that these junctions between the funnel edges be perfectly sealed from surrounding air, but preferably they prevent the possible migration of small insects such as biting midges out of the trap interior 18. Alternatively, the structure may be formed from a single, integral piece of plastic or glass to avoid the need for these connections.

The wide ends of the four rectangular funnels used to form the body 12 of the trap 10 in FIG. 1 may be joined to one another at substantially right angles along their opposite side edges to form a box-like structure. As depicted, this structure has indentations on each side to create inwardly directed and narrowing conduits 20 that lead to the interior space 18 of the trap 10. In this case, the narrow conduit ends 28 in the interior space 18 correspond to the tube structures of each of the rectangular funnels. The tube structures forming the narrow conduit ends 28 may have any type of cross sectional geometry, including a circular or rectangular geometry. These narrow conduit ends 28 extend into the interior space 18, and the centerline axes 15 of the conduits are at substantially right angles to one another and lie in a substantially common plane, in this case essentially a horizontal plane at a constant elevation above the base 16.

In the specific embodiment of the present invention as illustrated in FIG. 1, a light socket 24 is attached to the lid 14, but may alternatively be directly formed from, or embedded into the lid 14, in the same manner as commonly used, caged light bulbs for outdoor mechanical use. The attachment of the light socket 24 to the lid 14 in FIG. 1 is of the type used in porcelain lamps and comprises a nipple and brass ring assembly 24, where the ring component can be used as a point of attachment for hanging the insect trap 10. The light socket 24 is positioned such that, when a standard light bulb 26 is affixed thereto, the distance d measured as the shortest distance from the bulb 26 to the opening of any of the four conduits 20 at their narrow ends 28, is less than about one inch. As explained above, this configuration assures that the bulb 26 proximity to the conduit narrow ends 28 is sufficient to block escaping insects that must contend with not only the physical presence of the bulb 26, but also the intense heat and light generated during its operation. The bulb 26 used is preferably one with a power consumption of at least about 50 watts and preferably comprises clear glass. Surprisingly, it has been determined that the use of clear glass rather than white, frosted, or colored glass for the light bulb significantly affects both the number of insects attracted thereto as well as the types of insects. As explained above, clear glass tends to improve the overall selectivity of the trap to biting type insects.

As depicted in FIG. 1, the lid 14 is joined in a sealing manner to each of the funnels at their wide ends along edges, for example the top edges 25, of the wide ends that are not used to join one another. Likewise, the base 16 is joined in a sealing manner to each of the funnels 20 along the opposite edges, for example the bottom edges 27 of the wide ends. The base 16 of the housing is formed with some depth, such that it can hold water or some other liquid (not shown) for collecting, drowning, or poisoning trapped insects. In one embodiment, liquid held in the base 16 may be used to form the sealing connection between the base 16 and the body 12 of the trap 10. Also included in the trap 10 is a vent hole 22 for allowing heat to escape the trap 10 and/or preventing the accumulation of condensate along the inside surfaces of the body 12 when water or an aqueous solution is used to cover the base 16.

Figure 2:
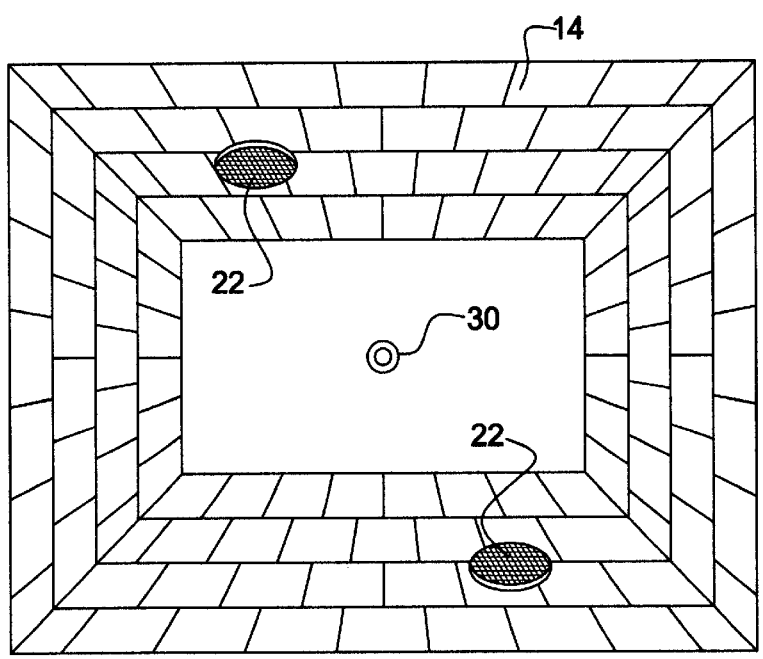
FIG. 2 is a top view of the insect trap of FIG. 1.

FIG. 2 shows a top view of the insect trap as depicted in FIG. 1. In this embodiment, the lid 14 has essentially a square periphery. This top view shows the relative positions of two vent hole openings 22 in the lid 14. An opening 30 is located in the center of the lid 14 and used to secure parts such as the brass ring assembly 24 in FIG. 1 as discussed above.

Figure 3:
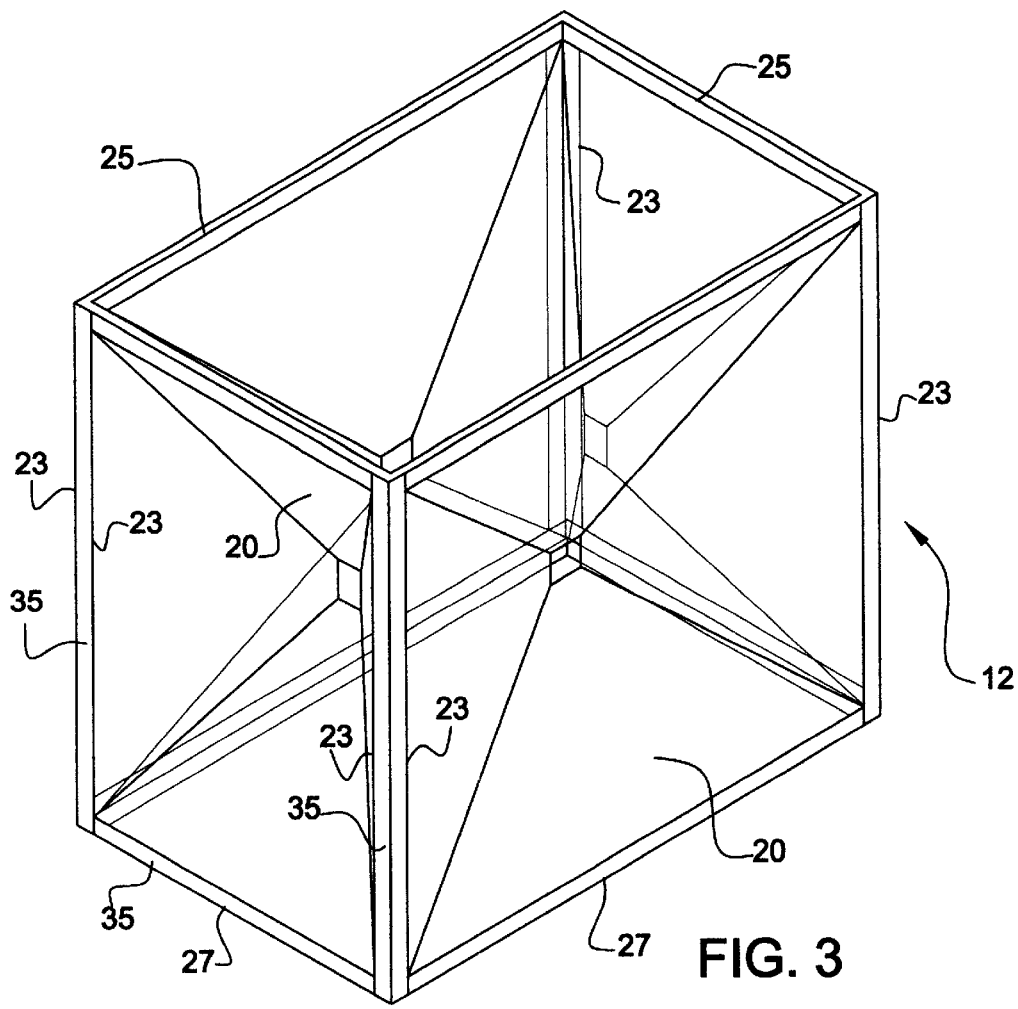
FIG. 3 is a perspective view showing the insect trap body comprising four funnels.

FIG. 3 is a perspective view showing the insect trap body 12 comprising four funnels 20 having rectangular bases at their wide ends and joined to each other at substantially right angles along opposite side edges 23 of the wide ends of the funnels. The body 12 therefore defines a rectangular prism with conduits 20 formed from each of four sides of the body 12 and leading to its interior. As shown, the wide ends of the funnels have a flat section or profile 35 at the top 25, bottom 27, and side 23 edges of the wide ends, which can facilitate the attachment of the funnels to form the body 12 of the insect trap 10.

Figure 4:
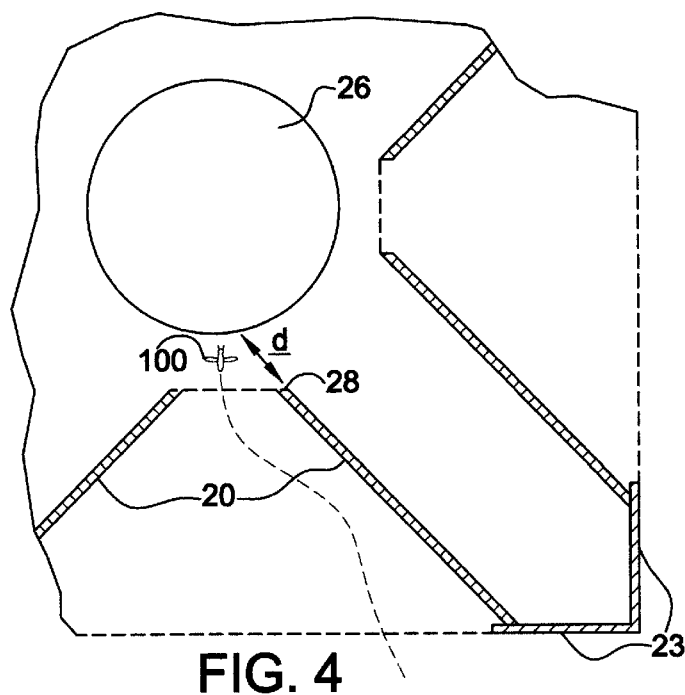
FIG. 4 is a cross-sectional top view of the insect trap along line A–A' of FIG. 1.

FIG. 4 is a cross-sectional top view of the insect trap shown in FIG. 1 taken along line A–A' in the upper corner section of the trap. From this view, the narrowing conduits 20 will guide an insect 100 attracted to the source of illumination, or light bulb 26, toward the interior of the trap. The narrow ends 28 of the conduits 20 are within a short distance d of about one inch or less from the bulb 26 to obstruct the openings at these narrow ends 28 and provide intense heat and light in this area to further hinder any backward migration of a trapped insect 100.

While these particular embodiments of the invention have been shown and described, it is recognized the various modifications thereof will occur to those skilled in the art. Therefore, the scope of the herein-described invention shall be limited solely by the claims appended hereto.

EXAMPLE 1

An insect trap of the present invention was tested on many occasions for a period starting at sundown and lasting until about three hours thereafter. Prior to testing, a light bulb was installed through the bottom of the trap by removing the body of the trap from its base. The base or lower pan of the trap was then filled to a depth of about two inches with water, to which several drops of detergent were added. A suitable location for placement of the trap was identified, based on minimal interference from other light sources. The trap body was placed on the base to form an interior space enclosed by the body and the surface of the water. The light bulb was supplied with power from a UL approved extension cord using a ground fault protected electrical outlet for the duration of the test.

At the end of each test, the light used in the insect trap was turned off and the trap was brought indoors and placed in a plastic bag. The following morning, water used at the bottom of the trap to drown and collect insects was poured out of the trap and strained through a paper towel. An approximate count of the dead insects in each case showed an average recovery of about 300 insects over the three hours of operation, or about 100 insects per hour. Several factors contributed to variations about this mean, including the insect population density and insect types in the surrounding region.

What is claimed is:

1. An insect trap comprising:

a) a body comprising four funnels comprising glass or a clear plastic, wherein each funnel has wide and narrow ends, wherein each of the wide ends has a top edge, a bottom edge, and side edges and wherein the funnels are joined to one another along the side edges of their wide ends at substantially right angles, and wherein the narrow ends extend into an interior space for trapping and killing insects;

b) a lid joined to the top edges of the wide ends of the four funnels, wherein: the lid comprises at least one vent screen and further comprises or is attached to a light socket into which a clear glass incandescent light bulb having a power consumption of at least 50 watts is secured; the bulb is within about one inch of each of the narrow ends of the funnels; and at least part of the lid is detachable to allow replacement of the bulb; and c) a base joined to each of the bottom edges of the wide ends of the four funnels, wherein the base is adapted to hold a liquid for drowning or poisoning insects and at least part of the base is detachable to allow cleaning of the trap.

* * * * *